United States Patent
Nieto Lopez

(10) Patent No.: US 9,040,822 B2
(45) Date of Patent: May 26, 2015

(54) SAFETY DEVICE FOR LIVE ELECTRICAL WIRE

(76) Inventor: Ricardo Nieto Lopez, Baytown, TX (US)

( * ) Notice: Subject to any disclaimer, the term of this patent is extended or adjusted under 35 U.S.C. 154(b) by 568 days.

(21) Appl. No.: 13/417,621

(22) Filed: Mar. 12, 2012

(65) Prior Publication Data

US 2012/0228025 A1    Sep. 13, 2012

Related U.S. Application Data

(60) Provisional application No. 61/452,104, filed on Mar. 12, 2011.

(51) Int. Cl.
| | |
|---|---|
| H02G 15/02 | (2006.01) |
| H02G 3/00 | (2006.01) |
| H02G 3/04 | (2006.01) |
| H01R 4/70 | (2006.01) |
| H01R 13/44 | (2006.01) |
| H02G 1/00 | (2006.01) |

(52) U.S. Cl.
CPC .................................... H02G 1/00 (2013.01)

(58) Field of Classification Search
CPC ....... H02G 1/00; H02G 15/06; H02G 15/064; H02G 15/068; H01R 4/26
USPC ........ 174/21 R, 74 A, 75 D, 75 R, 93, 137 R, 174/138 F; 439/135, 139, 140, 141, 142, 439/460
See application file for complete search history.

(56) References Cited

U.S. PATENT DOCUMENTS

| | | | |
|---|---|---|---|
| 1,255,824 A | 2/1918 | Shoenberg et al. | |
| 2,082,986 A | 6/1937 | Staley | |
| 2,506,979 A | 5/1950 | Varnum | |
| 2,983,779 A * | 5/1961 | Dumire et al. | 174/75 C |
| 3,090,988 A | 5/1963 | Truhon | |
| 3,629,790 A | 12/1971 | McSherry, Jr. | |
| 3,683,315 A | 8/1972 | Kelly | |
| 3,742,426 A * | 6/1973 | Huber et al. | 439/141 |
| 3,745,514 A * | 7/1973 | Brishka | 439/848 |
| 3,873,062 A | 3/1975 | Johnson et al. | |
| 3,926,494 A * | 12/1975 | Maillaro | 439/131 |
| 3,970,355 A * | 7/1976 | Pitschi | 439/578 |
| 4,340,267 A | 7/1982 | Nukaga | |

(Continued)

OTHER PUBLICATIONS

Definition of "fasten" from www.thefreedictionary.com Sep. 10, 2014.*

*Primary Examiner* — Chau N Nguyen
*Assistant Examiner* — Roshn Varghese
(74) *Attorney, Agent, or Firm* — Stephen S. Hodgson

(57) ABSTRACT

The present invention provides a safety device for protecting a person from an electrical shock while working on a live electrical wire connected to a terminal within an electric meter or circuit breaker box. The safety device comprises an inner cylinder slideably engaged within an outer cylinder and a spring disposed between the two cylinders for extending the outer cylinder axially outwardly with respect to the inner cylinder. The cylinders are made of nonconducting material. The inner cylinder engages insulation that covers the wire proximate to a bare end of the wire, which is connected to the terminal by a screw. When the person loosens the screw and the wire becomes disconnected from the terminal, the spring forces the outer cylinder outwardly to cover the bare end of the wire, which helps to protect the person from electrical shock.

20 Claims, 4 Drawing Sheets

(56) References Cited

U.S. PATENT DOCUMENTS

| | | | |
|---|---|---|---|
| 4,350,321 A | 9/1982 | Berg | |
| 4,445,739 A | 5/1984 | Wooten | |
| 4,717,608 A * | 1/1988 | Meltsch | 174/74 A |
| 4,815,495 A | 3/1989 | Remsburg | |
| 5,030,119 A | 7/1991 | Lowe | |
| 5,993,266 A * | 11/1999 | Mayer et al. | 439/680 |
| 6,167,291 A * | 12/2000 | Barajas et al. | 439/909 |
| 6,231,358 B1 | 5/2001 | Kerr, Jr. et al. | |
| 6,468,095 B2 | 10/2002 | Kerr, Jr. et al. | |
| 6,604,954 B2 | 8/2003 | Chu et al. | |
| 6,648,683 B2 * | 11/2003 | Youtsey | 439/578 |
| 7,011,535 B2 | 3/2006 | Dickie | |
| 7,094,080 B2 | 8/2006 | Dickie et al. | |
| 7,730,579 B2 | 6/2010 | Coe | |
| 2001/0034147 A1 * | 10/2001 | Kerr et al. | 439/141 |

\* cited by examiner

SAFETY DEVICE FOR LIVE ELECTRICAL WIRE

CROSS-REFERENCE TO RELATED APPLICATION

Priority is claimed to U.S. Provisional Patent Application Ser. No. 61/452,104, filed Mar. 12, 2011, which is incorporated by reference.

BACKGROUND OF THE INVENTION

This present invention pertains to residential, commercial and industrial electrical power supply and more particularly to a device for making live wires safer for electricians.

Electricity is often transmitted through power lines from a generating facility to a home, business or industrial facility. A utility company generally owns the generating facility and the power lines. Electricity is delivered to a consumer by running a cable from the power lines to a meter and then into a circuit breaker box. For example, electricity supplied by the utility company is metered at a home, and a cable runs from the meter into the circuit breaker box. The electricity is supplied at about 220 volts with each of two wires carrying about 110V and a third wire being neutral. The wires are connected to busses in the circuit breaker box by connection to a screw terminal. Since this electricity can only be controlled by the utility company, the wires to and from the meter and the wires to the circuit breaker box are always live or energized. An electrician needs to disconnect a live wire from a screw terminal from time to time, and there is a risk of electrical shock due to the wire springing out of the screw terminal and making direct or indirect contact with the electrician.

SUMMARY OF THE INVENTION

It is desirable to have a safety mechanism that protects an individual working with live or energized wires against the high voltages of electricity. It is also desirable for this safety mechanism to be simple and automatic so that it operates without obstructing the work process. The present invention provides in one embodiment a safety device for covering a bare end of an otherwise insulated electrical power wire. The device includes an inner member, an outer member and a spring element engaged with the inner and outer members. The inner member has an open bore through the inner member for receiving the wire in the bore, and the inner member has means for holding the wire in a fixed position with respect to the inner member such that an insulated portion of the wire is within the bore while the bare end of the wire protrudes from the inner member. The outer member has an opening through the outer member, and the inner member is moveably received in the opening in the outer member. The spring element moves the outer member with respect to the inner member between an uncovered position and a covered position, where the outer member covers the bare end of the wire in the covered position, and where the bare end of the wire is not covered while outer member is in the uncovered position. Preferably, an annular space is defined between the inner and outer members, and the spring element is in the annular space. The spring element is preferably a coiled spring. The outer member preferably includes a first member and a second member attached to the first member. The inner and outer members are preferably elongated tubes having a circular shape in a transverse cross-section.

The present invention provides in another embodiment a device, which includes a front cylinder, an inner cylinder, a back cylinder, and a spring element. The front cylinder has a tubular shape, a front portion and a back portion. The inner cylinder has a tubular shape, a front end and a back end, where the front end of the inner cylinder slides in the back portion of the front cylinder, and where the inner cylinder has a radially outwardly projecting flange. The back cylinder is received around the inner cylinder and has a forward end and a rear end. The forward end of the back cylinder is fixed to the front cylinder, and the rear end of the back cylinder has a radially inwardly projecting flange that abuts the radially outwardly projecting flange on the inner cylinder for limiting the axial movement of the inner cylinder. An annular space is defined between the inner cylinder and the back cylinder; and the spring element is received in the annular space. An open longitudinal bore is defined from the back end of and through the inner cylinder to the front portion of and through the front cylinder. The inner cylinder can preferably slide completely out of the front cylinder, and the front end of the inner cylinder is preferably beveled so that the inner cylinder can slide easily into the bore through the front cylinder. The inner cylinder preferably has wire-holding means for holding a wire in a fixed position in the bore. The wire-holding means preferably includes a projection that extends into the bore for engaging insulation on the wire and/or a wire stop for providing a surface that the insulation abuts. A cap or plug is preferably included that removeably engages with the front portion of the front cylinder for covering the bore.

The present invention provides in another embodiment a wire shield for covering a bare end of an otherwise insulated electrical wire. The wire shield includes a spring housing, a wire connector and a spring mechanism. The spring housing has a hollow, tubular shape, where the spring housing has a first stop at or near one end and a second stop spaced away from the first stop, where the first and second stops project inwardly. The wire connector has a hollow, tubular shape and a projection that extends outwardly, where at least a portion of the wire connector is received inside the spring housing, where the projection on the wire connector is received inside the spring housing between the first and second stops, and where the wire connector has means, preferably ratchet teeth, for holding the electrical wire. The spring mechanism is received inside the spring housing between the projection on the wire connector and either the first or the second stop on the spring housing. The wire shield has a length, and the wire shield has a greater length while the spring mechanism is in a relaxed state than while the spring mechanism is in an energy-storing state.

BRIEF DESCRIPTION OF THE DRAWINGS

A better understanding of the invention can be obtained when the detailed description of exemplary embodiments set forth below is considered in conjunction with the attached drawings in which.

DETAILED DESCRIPTION OF THE EXEMPLARY EMBODIMENTS

In one embodiment, the present invention provides a safety device which may be attached to an electrical power wire to protect a person against electrical shock from high-voltage electricity supplied from a utility company. The present invention provides in one embodiment a spring-loaded plastic insulator device that fits over a bare end of an insulated electrical wire, such as used in powering machines and lights in a home or in a commercial or industrial facility. In one embodiment the present invention comprises inner and outer cylindrically-shaped tubes that slideably engage with each other with a spring disposed between. The device has two stops, each stop being attached to opposing ends of the outer cylinder. Each stop projects radially towards the edge of the inner cylinder. The inner cylinder grips insulation that surrounds the wire with a plurality of teeth that are disposed at one end of the inner cylinder. The device is formed of an insulating material such as plastic.

While the wire is connected to a screw terminal, the spring is in a compressed state, and the bare end of the wire is inside the screw terminal. When a screw in the screw terminal is loosened, the spring relaxes and the outer cylinder springs forward to cover the bare end of the wire released from the terminal. The stops on the outer cylinder interact with the spring attached to the inner cylinder to act as barrier to keep the inner cylinder within the outer cylinder. The outer cylinder should be long enough to cover 0.5 inches to 1.0 inch of bare wire plus about 0.125 inches to about 0.250 inches of space when fully extended.

Figure 1:
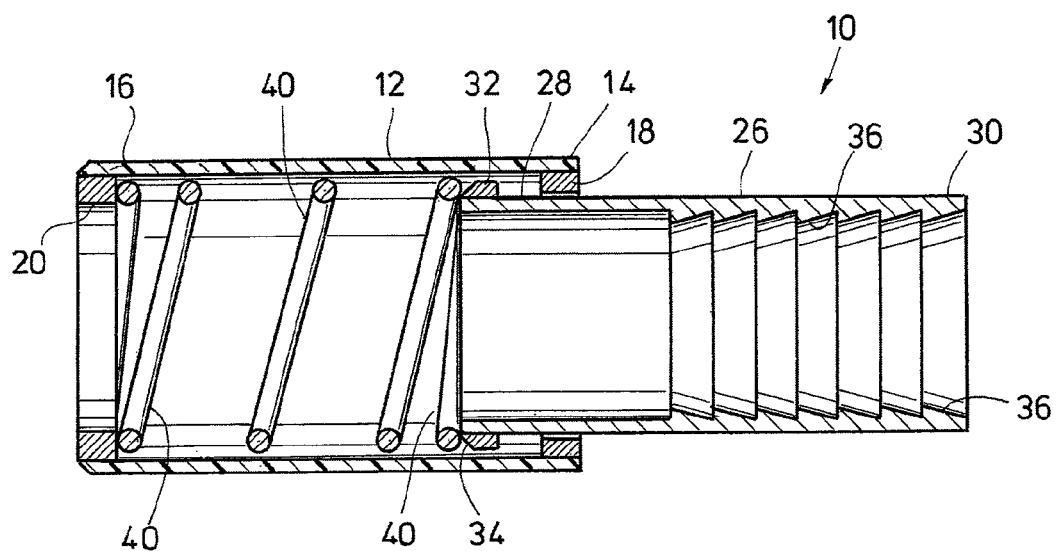
FIG. 1 is a side elevation in cross-section of a safety device for a live electrical wire, according to the present invention.

FIG. 1 is a side elevation in cross-section of a wire shield 10, according to the present invention. Wire shield 10 includes a first tube 12, which has a first end 14 and a second end 16. A transverse cross-section of first tube 12 preferably has a circular shape, but square, rectangular or polygonal shapes can be used. First tube 12 should be made of a material that is electrically nonconducting, an electrical insulator, such as a plastic. Thermoplastics such as polyethylene, polypropylene, acrylonitrile butadiene styrene copolymer and various homopolymers and copolymers are suitable materials. A first stop 18 is either an integral part of first tube 12 or can be a part that is bonded, adhered or fixed to an inside wall of the first tube 12. First stop 18 is preferably ring-shaped, but may be one or more discrete pieces placed adjacent to the first end 14 of first tube 12. A second stop 20 is fixed to the inside wall of first tube 12 adjacent to second end 16. Second stop 20 is shown as having a ring shape, but one or more discrete elements can serve the purpose of second stop 20.

Wire shield 10 includes a second tube 26, which has a first end 28 and a second end 30. A radially-extending projection 32 has a beveled leading edge 34, which gives first end 28 of second tube 26 a wedge or arrowhead shape. The first end 28 of the second tube 26 is received inside of first tube 12 through first end 14. Projection 32 has a circumference (or diameter in the case of a circular transverse cross-section) that is greater than the circumference (or diameter) defined by the inside wall of the first stop 18. Second tube 26 has a circumference (or diameter) that is less than the circumference (or diameter) defined by the inside wall of the first stop 18, so second tube 26 can slide back and forth readily, but snugly, inside first stop 18. The tapered leading edge 34 of projection 32 on second tube 26 makes it easier to force first end 28 of second tube 26 past first stop 18 and into the interior of first tube 12. Although not shown, the outside edge of first stop 18 can be beveled to matingly receive projection 32, which may make assembly easier. Wire shield 10 can be assembled by pushing projection 32 and first end 28 of second tube 26 into second tube 12 past first stop 18 on first tube 12. During assembly, first end 14 and first stop 18 on first tube 12 either expands or projection 32 and first end 28 of second tube 26 contracts or compresses or both first tube 12 expends and second tube 26 contracts, which allows radial projection 32 to pass by first stop 18 and into the interior of first tube 12. First tube 12, first stop 18, radial projection 32 and second tube 26 are sufficiently resilient such that after radial projection 32 on second tube 26 has passed by first stop 18 on first tube 12, first tube 12, first stop 18, radial projection 32 and second tube 26 return to normal size, after which radial projection 32 bumps against an inside edge of first stop 18. First stop 18 on first tube 12 thus retains the first end 28 of the second tube 26 inside first tube 12. After projection 32 has passed by first stop 18 and into the interior of first tube 12, second tube 26 cannot be disengaged from or removed from first tube 12 without undue force. More force would be required to remove the first end 28 of the second tube 26 from inside the first tube 12 than would be required to insert the first end 28 of the second tube 26 inside the first tube 12. Disassembly should require a great deal more force than assembly of wire shield 10, and disassembly is not required.

A number of gripping teeth 36 are provided along an inside wall of second tube 26, preferably adjacent to second end 30. Gripping teeth 36 in FIG. 1 comprise rings that are beveled to provide a sloping leading edge such that each ring has a greater inside diameter towards second end 30 than towards first end 26. The circumference defined by the inside wall of second tube 26 and by gripping teeth 36 (or diameter in the case of a circular cross-section) is sized to receive an electrical conductor or wire that has a layer of insulation. The second end 30 of second tube 26 can be forced onto the end of a conductor or wire, and the gripping teeth 36 slide over the insulation to provide a ratchet mechanism in which the second tube 26 is relatively easy to place onto the conductor or wire but relatively difficult to remove from the conductor or wire. The teeth 36 tend to bite into the layer of insulation that covers the conductor or wire, which prevents easy removal of the second tube 26 from the conductor or wire.

A coil spring 40 is received inside the first tube 12. One end of coil spring 40 presses against projection 32 and end 28 on the second tube 26, and the other end of coil spring 40 presses against second stop 20 on the second end 16 of the first tube 12. FIG. 1 shows coil spring 40 in a relaxed state, where coil spring 40 has pushed first tube 12 axially outwardly from second tube 26. If first tube 12 is moved such that end 28 of second tube 26 is moved closer to second end 16 of first tube 12, then coil spring 40 is compressed, which stores energy in coil spring 40. If wire shield 10 is held in a position with coil spring 40 in compression, and if first end 12 is then released, the energy stored in coil spring 40 will cause coil spring 40 to uncoil to its relaxed position shown in FIG. 1, moving first tube 12 axially outwardly with respect to second tube 26.

Figure 2:
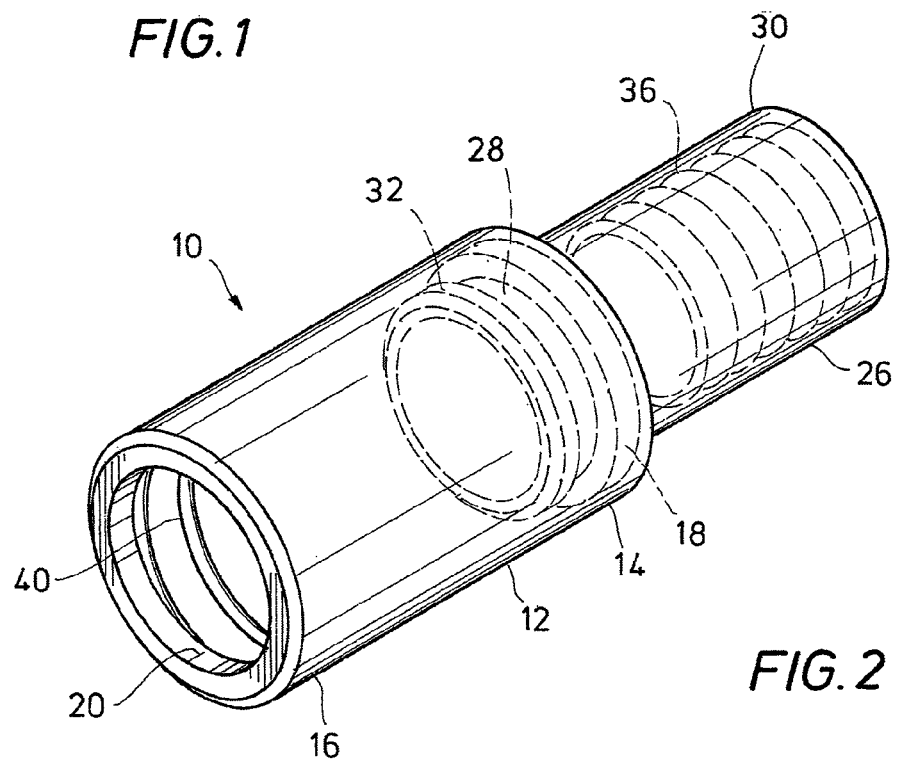
FIG. 2 is a perspective view of the safety device of FIG. 1.

FIG. 2 is a perspective view of the wire shield 10 of FIG. 1, which shows the first and second tubes 12 and 26 are hollow and cylindrical. The first end 28 of the second tube 26 is received inside of first tube 12, and the projection 32 on first end 28 of second tube 26 is retained between first stop 18 and second stop 20. First tube 12 can slide back over second tube 26, which compresses and stores energy in coil spring 40.

Figure 3:
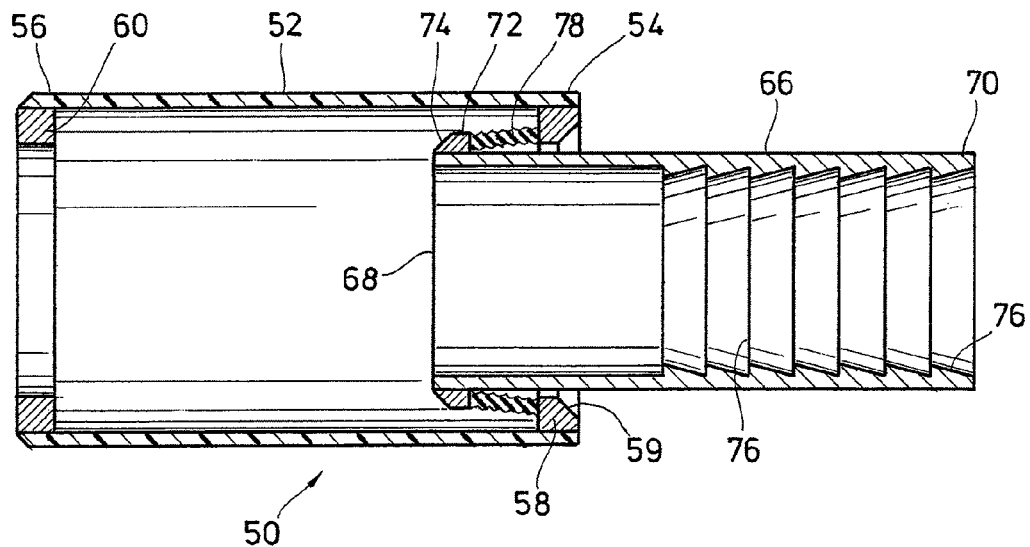
FIG. 3 is a side elevation in cross-section of an alternative embodiment of a safety device for a live electrical wire, according to the present invention.

FIG. 3 is an alternative embodiment of a wire shield 50 shown in a side elevation in a cross-section. Wire shield 50 has a first tube 52 with opposing first and second ends 54 and 56. A first stop 58 is located inside first tube 52 at first end 54, and a second stop 60 is fixed inside first tube 52 adjacent to second end 56. A second tube 66 has first and second ends 68 and 70. A radially outwardly extending projection 72 has a tapered, beveled leading edge 74 that provides a wedge or arrowhead shape for first end 68 of second tube 66. Circumferential rack gear gripping and ratcheting teeth 76 are provided on an inside wall of second tube 66 near second end 70 for attachment to insulation covering a wire. Unlike wire shield 10, the first stop 58 on wire shield 50 has an inwardly sloping beveled edge 59 for more easily allowing projection 72 to pass through first stop 58. Beveled edge 59 has about the same angle of slope as beveled edge 74. First stop 58 and projection 74 can be lubricated during assembly to allow projection 74 to more easily slip past first stop 58 on first tube 52. The feature of beveled edge 59 can also be incorporated into stop 18 in the embodiment illustrated in FIG. 1. Wire shield 50 has a spring element 78, which is received inside first tube 52 between the first stop 58 on the first tube 52 and projection 74 on first end 72 of second tube 66. Spring element 78 can be a coil spring in which the coils are packed closely together next to one another while spring element 78 is in a relaxed state in which case pulling the ends of the coil away from one another stores energy in the spring element 78. However, in the embodiment illustrated in FIG. 3, a resilient material 78 is used for spring element 78. Resilient material 78 can be stretched as first tube 52 is slid over second tube 66, which stores energy in resilient material 78. If first tube 52 is held back over second tube 66 and then released, the energy stored in resilient material 78 is used to move first tube 52 axially away from the second end 70 of the second tube 66.

Figure 4:
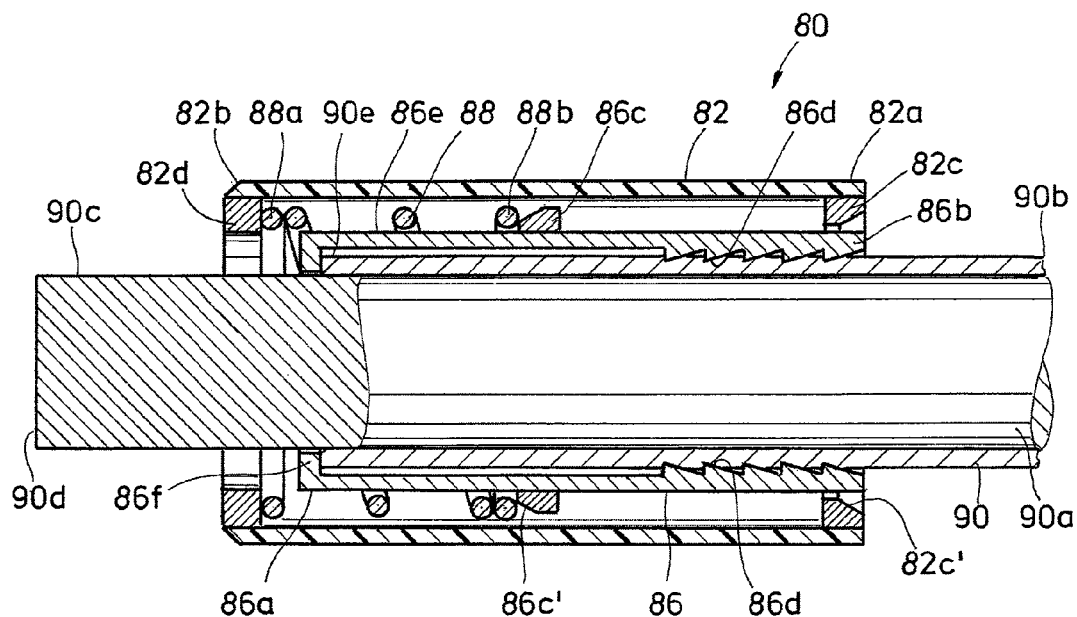
FIG. 4 is a side elevation in cross-section of an alternative embodiment of a safety device attached to an electrical wire, where the safety device is in a retracted state and a bare end of the electrical wire protrudes from the safety device, according to the present invention.

FIG. 4 is a side elevation in cross-section of a wire shield 80, according to the present invention. Wire shield 80 includes a spring housing 82, which has a first end 82*a* and a second end 82*b*. Spring housing 82 is preferably made of an electrically nonconducting plastic material, and a transverse cross-section of spring housing 82 has a circular shape in this embodiment. In this embodiment, spring housing 82 is made from a solid cylinder of a plastic material using appropriate machining tools, such as a drill press and a milling machine. However, wire shield 80 can be made by any suitable method and can be made of any suitable material. A non-conductive plastic material can be injection molded, for example, or a non-conductive metal can be forged or machined. In this embodiment, ring-shaped first and second stops 82*c* and 82*d* are integral parts of spring housing 82, which are left in place while a smaller inside diameter is formed for nearly the entire length of spring housing 82. First stop 82*c* has a sloped face 82*c*' that provides a smaller diameter at the end 82*a* than at the interior face of first stop 82*c*. Spring housing 82 can be described as a hollow cylinder having a length that is greater than its diameter and inwardly projecting shoulders on each end that function as stops. In the embodiment illustrated in FIG. 4, spring housing 82 has a length of about 2 inches, an inside diameter of about 0.9 inch and an outside diameter of about 1.1 inch, and the stops 82*c* and 82*d* have an inside diameter of about 0.6 inch.

Wire shield 80 includes a wire connector 86, which has a first or front end 86*a* and a second or back end 86*b*. Wire connector 86 has a length of about 1.75 inches and an outside diameter of about 0.5 inch in the embodiment illustrated in FIG. 4. Wire connector 86 has a radially-outwardly-extending projection 86*c*, which has a beveled leading edge 86*c*', which provides a wedge shape. Wire connector 86 is received inside spring housing 82, and projection 86*c* has a diameter that is greater than the inside diameter of first stop 82*c* on spring housing 82, but less than the inside diameter of spring housing 86 between its first and second stops 82*c* and 82*d*. The outside diameter of wire connector 86 is nearly as great, but slightly less than, the inside diameter of first stop 82*c* on spring housing 82, which allows wire connector 86 to slide back and forth easily inside spring housing 82, while fitting almost tightly within first stop 82*c* of spring housing 82. In this embodiment, spring housing 82 and wire connector 86 are machined or milled from solid plastic cylinders, and wire connector 86 must be forced into the interior of spring housing 82. The tapered leading edge 86*c*' on projection 86*c* on wire connector 86 makes it easier to force front end 86*a* of wire connector 86 past first stop 82*c* and into the interior of spring housing 82. Wire shield 80 can be assembled by pushing projection 86*c* and front end 86*a* of wire connector 86 into spring housing 82 past first stop 82*c* on spring housing 82. After the projection 86*c* of the wire connector 86 has been squeezed past first stop 82*c* on the spring housing 82, projection 86*c* and stop 82*c* expand back to their normal size, where stop 82*c* on the spring housing prevents projection 86*c* on the wire connector 86 from coming out from within spring housing 82. Thus, after wire shield 80 is assembled with wire connector 86 inside of spring housing 82, wire shield 80 cannot be easily disassembled. One might say that the wire connector 86 is essentially non-removeably, but slideably, received inside of the spring housing 82.

Wire connector 86 has a number of gripping teeth 86*d* near back end 86*b*, which project inwardly. Each of the gripping teeth 86*d* has a sloped face that provides a gradually lessening diameter from the edge of the tooth toward the back end 86*b* to the edge of the tooth toward the front end 86*a*. This allows insulation around a wire to slide into the wire connector 86, but not to slide out readily. The teeth provide a ratchet mechanism, which allows an insulated wire to slide into the wire connector 86, after which the teeth tend to bite into the insulation, which prevents the wire connector 86 from sliding off the insulated wire. It may be desirable to lubricate the insulation on a wire before pushing the wire into wire connector 86. It may also be desirable for the insulation on the wire to be warm and pliable to more easily slip into gripping teeth 86*d*. Wire connector 86 engages and holds a wire, and the gripping teeth 86*d* illustrate one way to engage and hold a wire. However, any suitable means can be used to fasten the wire connector to a wire. Instead of or in addition to the gripping teeth, one can clamp the wire connector onto a wire using one or more screws and a moveable plate that presses against the wire. One can use a bushing arrangement for fastening the wire connector to the wire, where a bushing threads into a tubular member and compresses a bushing material into a tight engagement with the wire. One can glue the wire connector to the wire, and one can provide threads inside the wire connector for threading the wire connector onto a wire. One can also tape a wire connector to a wire, since electricians frequently use electrical tape for various purposes, including insulating bare ends of two or more wires joined together.

Wire shield 80 in FIG. 4 differs from wire shield 10 in FIG. 1 in that outward projection 86*c* on the wire connector 86 in wire shield 80 is spaced some distance away from front end 86*a* on wire connector 86. In FIG. 1, projection 32 on second tube 26 is located at the leading edge of front end 28 of the second tube 26, which may be referred to as the inside tube or the wire connector tube, since it is inside an outer tube and since it receives and connects to a wire. In FIG. 4, the portion of the wire connector 86 between the front end 86a and the projection 86c is referred to as a spring holder portion 86e. Wire shield 80 also differs from wire shield 10 in that wire connector 86 in FIG. 4 has an inwardly projecting wire stop 86f at front end 86a. Wire stop 86f is an integral ring of material that remains with the hollow cylinder of material that comprises wire connector 86. Wire stop 86f projects radially inwardly a distance of about the thickness of insulation on a wire, and it has an inside diameter that allows the bare end of an insulated wire to pass through wire stop 86f, but prevents or stops the insulated portion of the insulated wire from passing through wire stop 86f.

A coil spring 88 is received inside the spring housing 82 near second or front end 82b. Coil spring 88 is received outside and around spring holder portion 86e of wire connector 86. A front end 88a of coil spring 88 presses against an inside face of stop 82d inside spring housing 82, and a back end 88b of the coil spring 88 presses against a front face on projection 86c on wire connector 86. Coil spring 88 wraps around and surrounds spring holder portion 86e of wire connector 86. An outside surface of spring holder portion 86e on wire connector 86 and an inside surface of spring housing 82 define an annular space sized to receive and hold coil spring 88. Consequently, coil spring 88 is trapped inside spring housing 82, outside spring holder portion 86e of wire connector 86, and between spring stop 82d on spring housing 82 and spring stop 86c on wire connector 86. Coil spring 88 can coil and uncoil freely within its defined space around spring holder portion 86e. Wire connector 86 slides freely back and forth within spring housing 82, provided force is applied to compress coil spring 88. Coil spring 88 in FIG. 4 is in a compressed state and is storing potential energy. Coil spring 88 is held in the position shown in FIG. 4 by means not shown in FIG. 4. FIG. 4 shows the appearance of wire shield 80 while in use, such as will be described below with reference to FIG. 5. For the embodiment in FIG. 4, the spring holder portion 86e is about 0.75 inch long, which is the distance from front end 86a to projection 86c on wire connector 86, and coil spring 88 compresses to about 0.75 inch long. Coil spring 88 will expand far enough to press extension 86c on wire connector 86 against first stop 82c on spring housing 82, which will fully retract end 90d of wire 90 into the interior space defined by spring housing 82. A different type of spring can be substituted for coil spring 88, such as a resilient material or a hydraulic piston. If spring housing 82 and wire connector 86 are machined as separate parts, one may thread the coil spring into the spring housing 82 prior to forcing the wire connector 86 into the spring housing 82.

An insulated wire 90 is received in wire shield 80. Insulated wire 90 has a conductor 90a, which is typically a metal such as copper or aluminum, and a layer of electrically non-conductive insulation 90b surrounds conductor 90a. An end portion of the insulation 90b has been stripped away, leaving a bare, exposed portion 90c of conductor 90a adjacent to an end 90d of insulated wire 90. Insulation 90b has a front end 90e that remains after the end portion of the insulation 90b is stripped away. Front end 90e of the layer of insulation 90b rests against wire stop 86f on front end 86a of wire connector 86, after insulated wire 90 is pushed into full engagement with wire connector 86, and the gripping teeth 86d on the wire connector 86 engage or bite into the layer of insulation 90b, which prevents the insulated wire 90 and the wire connector 86 from disengaging or coming apart. The bare, exposed portion 90c of the insulated wire 90 protrudes longitudinally outwardly from the wire shield 80, while coil spring 88 is compressed, and the bare end 90c of the wire 90 can be fastened into engagement with a screw terminal in electrical equipment, such as in an electrical meter or in an electrical circuit breaker box.

To use wire shield 80, a person, typically an electrician, strips typically a half inch to one inch of insulation off the end of insulated wire 90 and then forcefully slides wire shield 80 onto the end of the wire until the end 90e of the insulation 90b on wire 90 presses up against wire stop 86f inside wire connector 86. While coil spring 88 is in its relaxed state, bare end 90c of wire 90 is inside the spring housing 82, which helps to prevent direct or indirect contact between the bare end 90c of wire 90 and a human or animal. With wire shield 80 fixed onto the wire 90, the person can then push the bare end 90c of wire 90 into a screw terminal and tighten a screw in the screw terminal, which fastens the bare end 90c of wire 90 into the screw terminal for conduction of electricity through the wire 90 into the screw terminal or vice versa. Front end 82b and stop 82d on spring housing 82 rest against the screw terminal while the wire 90 is fastened to the screw terminal, and spring 88 is compressed and storing potential energy. If the screw on the screw terminal is loosened and the bare end 90c of wire 90 comes out of the screw terminal, then spring 88 will expand, converting its stored potential energy into kinetic energy, which will force spring housing 82 on wire shield 80 to move outwardly with respect to bare end 90c of wire 90, thereby covering bare end 90c and 90d. Bare end 90d will be retracted so that it is inside of spring stop 82d of spring housing 82, which will help to avoid direct or indirect contact between bare end 90c and 90d of wire 90 and a human or animal, and this is an important safety precaution because wire 90 may be carrying electricity, which could hurt or kill the human or animal.

Figure 5:
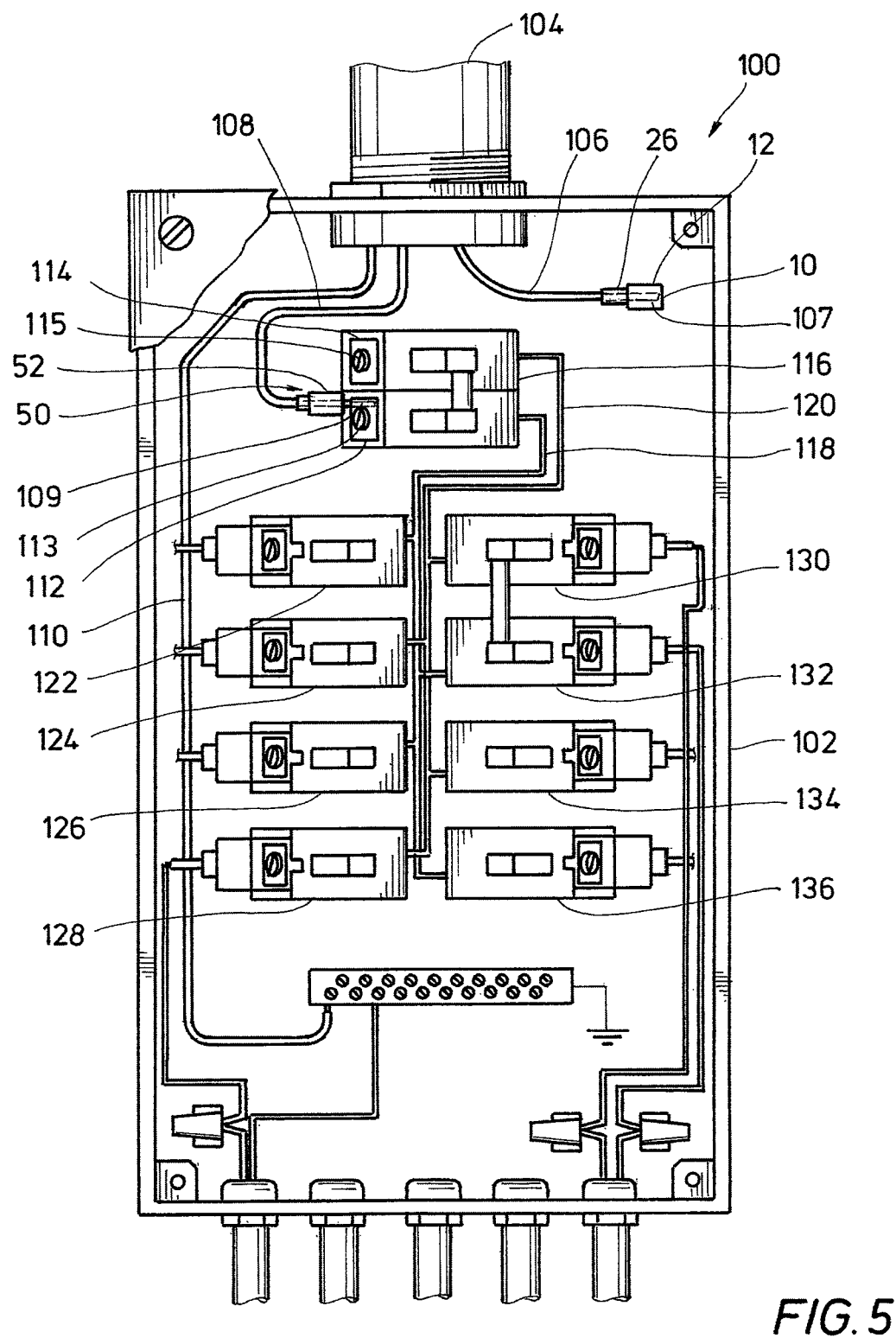
FIG. 5 is a side elevation of a circuit breaker box showing the safety device of the present invention in a typical application.

FIG. 5 is a side elevation of a circuit breaker box 100 for illustrating how the wire shield of the present invention can make working on a circuit breaker box safer. U.S. Pat. No. 5,510,946, issued to Franklin and incorporated by reference, describes a typical circuit breaker box and how circuit breaker box 100 operates. Circuit breaker box 100 includes a box 102 to which a conduit 104 is attached. Electrical wires 106, 108 and 110 are received from an electric meter (not shown), which a utility company uses to measure the amount of electricity that it supplies from a power generating plant. Wires 106 and 108 each can supply electricity at about 110 volts, and wire 110 is a neutral or ground wire. Wire 108 is attached to a screw terminal 112, and a screw terminal 114 is available to receive wire 106. Electricity supplied to screw terminal 112 and 114 passes through a main switch 116, while it is closed, and to busses 118 and 120, respectively. Main switch 116 can be opened to prevent the flow of electricity to busses 118 and 120. Circuit breakers 122, 124, 126, 128, 130, 132, 134 and 136 provide switches for turning off electricity to particular circuits.

Wires 106 and 108 are always energized or live while the utility company is providing electricity, and there is no local switch for deenergizing or turning off the electricity on wires 106 and 108. Consequently, if one, preferably an electrician, needs to disconnect wire 108 from screw terminal 112, one must unsrcew a screw 113, while it is hot, live or energized. Wires 106, 108 and 110 are generally thick, stiff wires. Wires 106, 108 and 110 are covered with a layer of electrically nonconductive insulation that makes the wires safe to handle while energized, except the ends of the wires are stripped bare for connection to a screw terminal. For example, the end of wire 108 inside screw terminal 112 under screw 113 is bare, while the rest of wire 108 is covered in insulating plastic. When a person loosens screw 113, there is a reasonable probability that wire 108 will spring out suddenly from screw terminal 112. The sudden springing can result in the bare end of wire 108 contacting the person, which likely causes an electrical shock and injury to the person and possibly electrocution leading to death. The sudden springing out of wire 108 from screw terminal 112 can also result in the bare end of the wire touching box 102, which energizes box 102, and if the person or someone else is touching or touches the energized box, electric shock or electrocution may occur through box 102.

Wire shield 10 has been installed on the end of wire 106 as a safety device for helping to prevent accidental electrical shock or electrocution due to direct or indirect contact between a bare end 107 of wire 106 and a person. The smaller diameter tube 26 has been slid past bare end 107 and into an engagement between teeth 36 and the insulated covering of wire 106, which secures wire shield 10 to the end of wire 106. Screw terminal 114 has a screw 115, which can be loosened to receive bare end 107 of wire 106. The larger diameter tube 12 of wire shield 10 is slid backwards over smaller diameter tube 26 as bare end 107 is pushed into screw terminal 114 under screw 115, which stores potential energy in coil spring 40. If screw 115 is subsequently loosened and wire 106 springs out or is otherwise removed from screw terminal 114, then the stored potential energy in coil spring 40 causes tube 12 to move over and cover the bare end 107 of wire 106, which substantially reduces the risk of electrical shock or electrocution from wire 106. At least the larger diameter tube 12 that covers bare end 107 of wire 106 should be made of an electrically insulating or nonconduction material such as a plastic. Wire 108 has a bare end 109, which is attached to screw terminal 112 by screw 113. Bare end 109 is hidden by screw terminal 112, so it is shown in dashed lines in FIG. 5. With reference to FIG. 3, wire shield 50 is fastened onto the end of wire 108 by a ratchet engagement between the plurality of gripping teeth 76 and the insulated covering of wire 108. The larger diameter tube 52 is pushed back over the smaller tube 66, which stretches the resilient material 78 and stores potential energy in the resilient material, which wants to return to it relaxed state shown in FIG. 3. If a person loosens screw 113 and wire 108 pops out suddenly, the spring element 78 releases it stored energy and pulls the large tube 52 outward to cover the bare end 109 of wire 108.

A wire shield of the present invention is preferably made of electrically insulating, nonconductive material. The wire shield can be made by injection molding of a thermoplastic. Molds for making longitudinal halves of the smaller and larger diameter tubes can be injected with a molten thermoplastic and cooled to form solid longitudinal halves that would have the appearance of the cross-sections shown in FIGS. 1, 3 and 4. Simplicity calls most likely for a coil spring as shown as element 40 in FIG. 1 or a coil spring in the position of spring element 78 in FIG. 3, where this coil spring would be contracted in its relaxed state. Two halves of the smaller diameter tube can first be glued together to form a tube. The spring can be placed in one half of the larger diameter tube. With the spring in place the smaller diameter tube can be placed inside one half of the larger diameter tube such that the radial projection on the smaller diameter tube is trapped between the stops in the larger diameter tube. A second half of larger diameter tube can then be glued to form a unitary large diameter tube in which the smaller diameter tube is trapped in a sliding engagement. Alternatively, the tubes that comprise the wire shield can be forged from a molten, nonconductive material or can be machined or milled from solid, nonconductive stock.

The diameter of electrical wire is communicated through a system know as the American wire gauge (AWG), which is a standardized wire gauge system for identifying the diameters of round, solid, electrically conducting wire, which is typically made of copper. Table 1 provides the diameter for a number of gauges of bare wire. A thin coating of insulation covers the bare wire, and the coating may have a thickness of about 0.1 inch or one-eighth of an inch for large-diameter wire or a thickness of one sixteenth of an inch for a smaller diameter wire, but this information is available from a wire manufacturer. In any case, the wire shield should be sized so that the gripping teeth engage the insulation and so that the large tube is long enough to more than cover the amount of bare wire that may be likely to be exposed. Different sizes of wire shields can be made for different sizes of wire and can be color coded according to size. With reference to FIG. 4, the wire shield may be sized such that the back end 86b of the wire connector 86 is even with the first or back end 82a of the spring housing 82, while the bare end 90c of the wire 90 is properly engaged with a screw terminal for indicating that the bare end 90c has been inserted into the screw terminal to a proper depth.

TABLE 1

| AWG | Diameter (inch) | Diameter (mm) |
| --- | --- | --- |
| 0000 (4/0) | 0.4600 | 11.684 |
| 000 (3/0) | 0.4096 | 10.404 |
| 00 (2/0) | 0.3648 | 9.266 |
| 0 (1/0) | 0.3249 | 8.252 |
| 1 | 0.2893 | 7.348 |
| 2 | 0.2576 | 6.544 |
| 3 | 0.2294 | 5.827 |
| 4 | 0.2043 | 5.189 |
| 5 | 0.1819 | 4.621 |
| 6 | 0.1620 | 4.115 |

Figure 6:
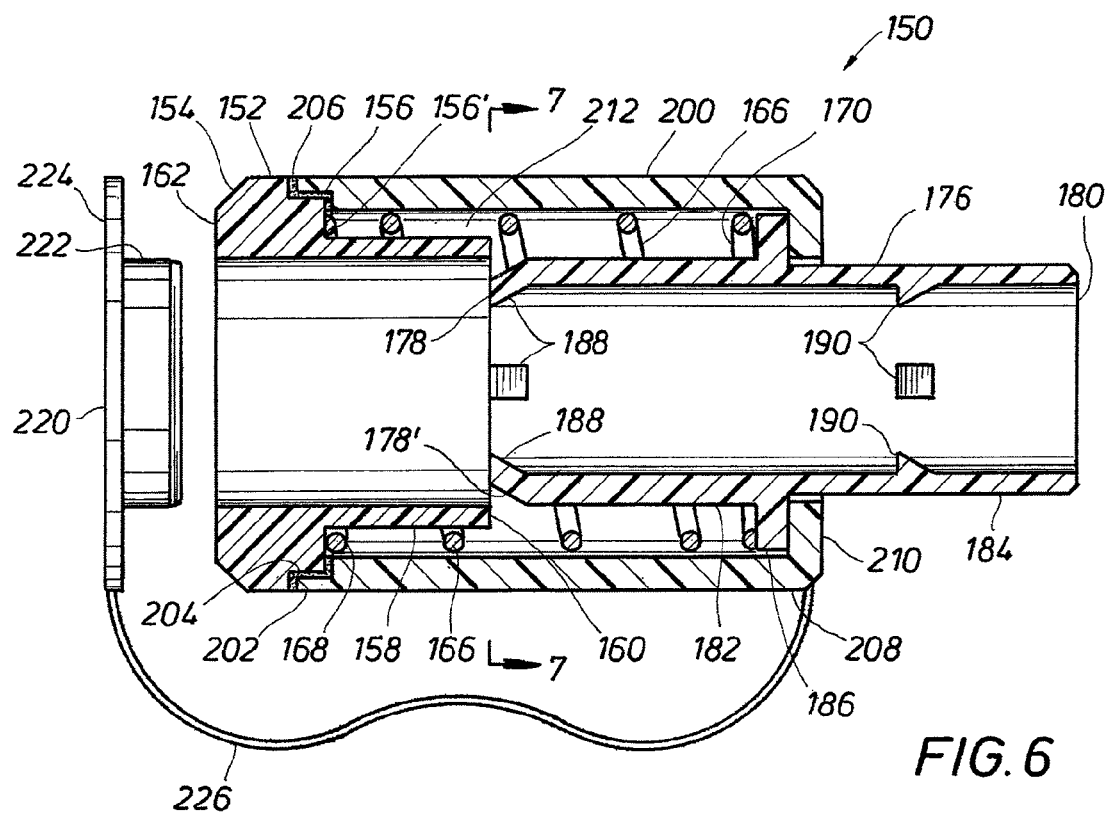
FIG. 6 is a side elevation in cross-section of an alternative embodiment of a safety device for a live electrical wire, according to the present invention.

FIG. 6 is another alternative embodiment of the present invention. FIG. 6 is a side elevation in cross section of a live wire safety device 150 according to the present invention. Safety device 150 has a front cylinder 152, which has a tubular shape, and a transverse cross-section of front cylinder 152 is circular. A front outside edge 154 is beveled. A prototype of front cylinder 152 has an inside diameter of 0.67 inch, an outside diameter of 1.1 inch, and a length of 0.82 inch. In the prototype, at about 0.30 inch from the front, the thickness of front cylinder 152 is reduced a first amount (about 0.064 inch) and then a second amount, and a shoulder 156 is formed, which has a longitudinal length of about 0.064 inch. A thin-walled back end portion 158 extends from the shoulder 156 to a back end 160, and back end portion 158 has a length of about 0.45 inch in the prototype. The wall thickness of the thin-walled back end portion 158 is about 0.03 inch for the prototype, and the wall thickness of the thickest part near beveled edge 154 is about 0.22 inch. Front cylinder 152 can be described as a tube having a length about equal to its outside diameter, where about two-thirds of the length of the tube wall has been thinned, and the stair-step-shaped shoulder 156 is formed between a maximum wall thickness at a front end 162 and a minimum wall thickness at the thin-walled back end portion 158.

A coiled spring 166 is received around an outside surface of the thin-walled back end portion 158 of front cylinder 152. A forward end 168 of coiled spring 166 rests against a wall portion 156' of the stair-step-shaped shoulder 156. Coiled spring 166 has a rearward end 170 opposing forward end 168.

A wire-gripping inner cylinder 176 is received inside of coiled spring 166 and has a front end 178 and a back end 180. Front end 178 has a beveled outer edge 178' about its circumference. Front end 178 is slideably received inside of front cylinder 152, and beveled edge 178' makes it easier for front end 178 of inner cylinder 176 to move inside of front cylinder 152 as coiled spring 166 is compressed. Inner cylinder 176 has a front portion 182 and a back portion 184. A flange 186 projects radially outwardly from the outer surface of inner cylinder 176 between front portion 182 and back portion 184. Flange 186 is located about midway between front end 178 and back end 180, but front portion 182 is preferably slightly longer than back portion 184. Inner cylinder 176 has four wire stops 188 on front end 178, which project radially inwardly from an inside surface of inner cylinder 176 at front end 178. Similar to wire stop 86f in FIG. 4, wire stops 188 in FIG. 6 project radially inwardly a distance of about the thickness of insulation on a wire, and wire stops 188 define an inside diameter that allows the bare end of an insulated wire to pass through wire stops 188, but prevents or stops the insulated portion of the insulated wire from passing through wire stop 188. Four insulation gripper prongs 190 project radially inwardly from the inside surface of the back portion 184 of wire-gripping inner cylinder 176. Insulation gripper prongs 190 can also or instead be located in front portion 182 of wire-gripping inner cylinder 176.

A prototype of wire-gripping inner cylinder 176 is 2.3 inches long; the front portion 182 is 1.14 inches long; the flange 186 is 0.17 inch thick; and the back portion 184 is 0.95 inch long. Wire-gripping inner cylinder 176 has a constant inside diameter of about 0.52 inch throughout its length in the prototype. The wall thickness of the front portion 182 is greater than the wall thickness of the back portion 184, and the outside diameter of the front portion 182 is about 0.76 inch, while the outside diameter of the back portion 184 is about 0.65 inch in the prototype. The outside diameter of flange 186 is about 0.83 inch for the prototype.

With continuing reference to FIG. 6, an outer back cylinder 200 is received around the outside of wire-gripping inner cylinder 176 such that the rearward end 170 of coiled spring 166 is disposed between the outside surface of inner cylinder 176 and the inside surface of outer back cylinder 200. Rearward end 170 of coiled spring 166 rests against a forward face of flange 186, which protrudes radially outwardly from the outside surface of inner cylinder 176. Outer back cylinder 200 has a front end 202, and the thickness of the wall of back cylinder 200 is reduced at the front end 202, which provides a shoulder 204. Shoulder 204 of back cylinder 200 matingly engages with stair-step-shaped shoulder 156 on front cylinder 152, and back cylinder 200 can be glued, bonded or adhered to front cylinder 152 where shoulder 204 of back cylinder 200 engages with stair-step-shaped shoulder 156 on front cylinder 152. A glue 206 is illustrated in FIG. 6, but alternatively, shoulders 156 and 204 could be threaded, and back cylinder 200 could be threadedly engaged with front cylinder 152.

Back cylinder 200 has a rear end 208, and rear end 208 has a radially inwardly projecting flange 210. Radially inwardly projecting flange 210 is preferably a continuous ring formed integral with back cylinder 200. Radially inwardly projecting flange 210 of back cylinder 200 has a front face that presses against a back face of radially outwardly projecting flange 186 on wire-gripping inner cylinder 176. For the prototype of live wire safety device 150, back cylinder 200 is about 2.0 inches long with an outside diameter of 1.1 inch and an inside diameter of about 0.86 or 0.9 inch. The inside diameter at flange 210 is about 0.78 inch.

To assemble live wire safety device 150, the forward end 168 of coiled spring 166 is placed against the wall portion 156' of the stair-step-shaped shoulder 156 on front cylinder 152. The front end 178 of wire-gripping inner cylinder 176 is placed inside of and through the rearward end 170 of coiled spring 166 until the rearward end 170 of coiled spring 166 rests against the front face of radially outwardly projecting flange 186 on wire-gripping inner cylinder 176. The outer back cylinder 200 is placed around the outside of wire-gripping inner cylinder 176, and the front end 202 of back cylinder 200 is attached to the front cylinder 152 at shoulder 156 on front cylinder 152. The stair-step shape of shoulder 156 provides two radial surface and one longitudinal surface for gluing or bonding back cylinder 200 to front cylinder 152. After back cylinder 200 is glued to front cylinder 152, a single, integral cylinder is formed. An annular space 212 is defined between an outer surface of thin-walled back end portion 158 of front cylinder 152 and an inner surface of back cylinder 200 proximate to front end 202 of back cylinder 200. Forward end 168 of coiled spring 166 is received in annular space 212, and the forward end 168 of coiled spring 166 rests against the wall portion 156' of the stair-step-shaped shoulder 156 of front cylinder 152.

An insulated wire, which is not shown in FIG. 6, can be received inside of live wire safety device 150 in a manner similar to how wire 90 is received in wire shield 80 in FIG. 4. FIG. 6 shows live wire safety device 150 in a relaxed state, and in the relaxed state, the bare end of a wire would be surrounded by front cylinder 152. The front end of insulation surrounding the wire would rest against wire stops 188. The insulation gripper prongs 190 press into the insulation that covers the wire and have a ratchet-tooth shape that allows the wire to be pushed into engagement with wire-gripping inner cylinder 176, while holding the wire in essentially permanent engagement after the wire is pushed inside of inner cylinder 176 until the front edge of the insulation rests against a back face of wire stops 188. With reference to FIG. 5, the front, bare end of the wire can be attached to screw terminal 112 or 114 while front cylinder 152 and back cylinder 200 are slid back towards back end 180 of wire-gripping inner cylinder 176, which compresses spring 166 and stores energy so that front cylinder 152 and back cylinder 200 will move forward and cover the bare end of the wire in the event that the bare end of the wire becomes disconnected from the screw terminal. For the prototype, the bare end of the wire has an outside diameter of 0.4 inch, and the outside diameter of the insulated portion of the wire is about 0.51 inch. About an inch or so of insulation was stripped from the wire, so the bare end of the wire is about an inch long.

Live wire safety device 150 is preferably provided with a cap 220, which has a cylindrical portion 222 sized to fit snugly inside of front cylinder 152. Cylindrical portion 222 is fixed to or formed integral with a circular plate or a flat, elongated bar 224, which has a diameter that is about the same or slightly greater than the outside diameter of the front cylinder 152 for providing a handle for dislodging cap 220 from engagement with front cylinder 152. Cap 220 is preferable removeably engaged with front cylinder 152 while live wire safety device covers a live electrical wire, which is not engaged with a screw terminal, for completely surrounding and enclosing the bare end of the wire. Cap 220 is preferably tethered to back cylinder 200 by a plastic string 226, which is attached at one end to cap 220 and at the other end to rear end 208 of back cylinder 200.

Figure 7:
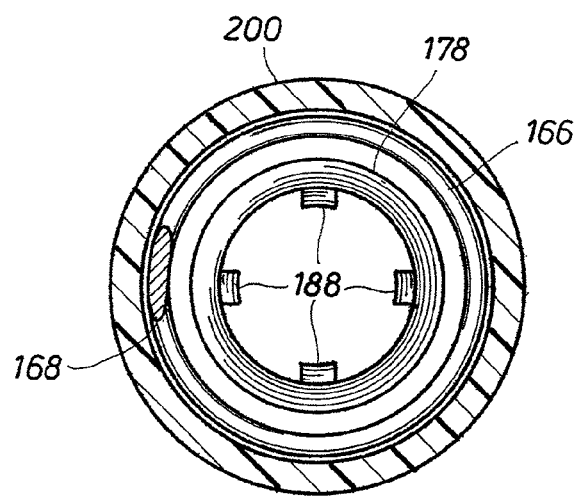
FIG. 7 is a cross-section of the safety device of FIG. 6 as seen along the line 7-7.

FIG. 7 is a cross-section of the live wire safety device 150 of FIG. 6, as seen along the line 7-7, except the string 226 is not shown in FIG. 7. It is believed that having discrete wire stops 188 and insulation gripper prongs 190 (FIG. 6), as opposed to continuous rings about the inside surface of inner cylinder 176, will allow a manufacturer to more easily injection mold or blow mold inner cylinder 176, which is preferably made of a plastic material that does not conduct electricity. The plastic material for live wire safety device 150 can be a thermoset plastic and/or a thermoplastic, such as an ABS or PVC plastic. It is further believed that wire stops 188 should be rotated about 45 degrees with respect to insulation gripper prongs 190 so that wire stops 188 are not aligned with insulation gripper prongs 190 so that a mold will release from wire-gripping inner cylinder 176. It is believed that each of front cylinder 152, inner cylinder 176 and back cylinder 200 can be injection or blow molded as a single unitary part. Live wire safety device 150 can be sized to fit a particular wire size, and its length can be adjusted accordingly. The length can also be adjusted to some extent to fit within a particular design of a meter box or a circuit-breaker box or for a similar application.

Embodiments of the Invention

The present invention provides in one embodiment (1) a wire insulating device, comprising: a first hollow cylinder, wherein the first hollow cylinder has at least two inward stops at a back end of the first hollow cylinder and at least two inward stops at a front end of the first hollow cylinder; a second hollow cylinder, wherein the second hollow cylinder has a gripping end opposing a rear end, and at least two outward stops at the rear end, and wherein the second hollow cylinder engages slideably with the first hollow cylinder; and a spring, wherein the spring is disposed between the first hollow cylinder and the second hollow cylinder. In an embodiment (2), the wire insulating device of embodiment 1, wherein the inward stops project radially towards the center of the first hollow cylinder, and wherein the outward stops project radially towards the edge of the first hollow cylinder. (3) The wire insulating device of embodiment 1, wherein the inward stops and the outward stops have the shape of a ring and work to stabilize the second hollow cylinder within the first hollow cylinder. (4) The wire insulating device of embodiment 1, further comprising a plurality of teeth disposed on the gripping end, and wherein the teeth have an angled slope for grasping an insulation covering on a bare wire. (5) The wire insulating device of embodiment 1, wherein the first hollow cylinder, the second hollow cylinder, the inward stops and the outward stops are formed of a plastic material.

The present invention provides in an embodiment (10) a method of using a spring-loaded wire insulating device to protect against the safety hazards of the bare wire, comprising: compressing the spring in the spring-loaded wire insulating device when the bare wire is connected to a terminal in a breaker box; expanding the spring in the spring-loaded wire insulating device as the bare wire is disconnected from the terminal; and forcing the second hollow cylinder outward to enclose the bare wire when the spring expands. The wire insulating device of embodiment (10), wherein about 0.5 inches to about one inch of the bare wire connects into the terminal in the breaker. The wire insulating device of embodiment 10, wherein the second hollow cylinder fully encloses the bare wire plus about 0.125 inches to about 0.25 inches of space when the second hollow cylinder is fully extended. The wire insulating device of embodiment 1 or 10, wherein an inside diameter of the second hollow cylinder is slightly larger than the outside diameter of the wire on which it will be received while the inside diameter of the gripping teeth is slightly smaller that the outside diameter of the wire on which it will be received.

In another embodiment, the present invention provides a device, which includes a first tube having opposing first and second open ends, wherein the first tube has an internal circumference; first and second stops fixed inside the first tube adjacent to the first and second ends, respectively, wherein the first and second stops define an internal circumference that is less than the internal circumference of the first tube; a second tube slideably received in the first tube, wherein the second tube has opposing first and second open ends; a projection fixed on or formed integral with the first end of the second tube, wherein the projection and the first end on the second tube each have an external circumference, wherein the external circumference of the projection is greater than the external circumference of the second tube, where the external circumference of the second tube is less than the internal circumference defined by the first and second stops, and where the external circumference of the projection is less than the internal circumference of the first tube but greater than the internal circumference defined by the first and second stops.

The present invention also provides in another embodiment a method for making a bare end of an otherwise insulated electrical wire safer to work on, and the method includes the steps of installing a tubular shield on the wire so as to cover the bare end and installing the bare end of the wire in a screw terminal, where it is necessary to store energy in a spring means in order to install the bare end of the wire in the screw terminal. The tubular shield includes a first tube having opposing first and second open ends, wherein the first tube has an internal circumference; first and second stops fixed inside the first tube adjacent to the first and second ends, respectively, wherein the first and second stops define an internal circumference that is less than the internal circumference of the first tube; a second tube slideably received in the first tube, wherein the second tube has opposing first and second open ends; a projection fixed on or formed integral with the first end of the second tube, wherein the projection and the first end on the second tube each have an external circumference, wherein the external circumference of the projection is greater than the external circumference of the second tube, where the external circumference of the second tube is less than the internal circumference defined by the first and second stops, where the external circumference of the projection is less than the internal circumference of the first tube but greater than the internal circumference defined by the first and second stops so that expansion of the first tube and first or second stop and/or compression of the second tube and projection is required for inserting the second tube into the first tube; means for attaching the second tube to the wire; and a spring means received in the first tube such that an energy-storing state of the spring means has the first end of the second tube moved toward the second end of the first tube as compared to a relaxed state of the spring means in which the first end of the second tube is moved away from the second end of the first tube; where the first tube surrounds the bare end of the wire while in the relaxed state, and where at least the first tube is made of an electrically-insulating material.

In another embodiment, a safety device for covering a bare end of an otherwise insulated electrical power wire is provided, which includes an inner member, an outer member and a spring element engaged with the inner and outer members. The inner member has an open bore through the inner member for receiving the wire in the bore, and the inner member has means for holding the wire in a fixed position with respect to the inner member such that an insulated portion of the wire is within the bore while the bare end of the wire protrudes from the inner member. The outer member has an opening through the outer member, and the inner member is moveably received in the opening in the outer member. The spring element moves the outer member with respect to the inner member between an uncovered position and a covered position, where the outer member covers the bare end of the wire in the covered position, and where the bare end of the wire is not covered while outer member is in the uncovered position. Preferably, an annular space is defined between the inner and outer members, and the spring element is in the annular space. The spring element is preferably a coiled spring. The outer member preferably includes a first member and a second member attached to the first member. The inner and outer members are preferably elongated tubes having a circular shape in a transverse cross-section. The present invention also provides in another embodiment a method for covering a bare end of an otherwise insulated electrical wire for making the wire safer to work around, and the method includes the steps of installing the safety device described above on the wire so as to cover the bare end and installing the bare end of the wire in a screw terminal, where it is necessary to store energy in the spring element in order to install the bare end of the wire in the screw terminal. A similar method can be used with each embodiment of an inventive device described herein.

The present invention provides in another embodiment a device, which includes a front cylinder, an inner cylinder, a back cylinder, and a spring element. The front cylinder has a tubular shape, a front portion and a back portion. The inner cylinder has a tubular shape, a front end and a back end, where the front end of the inner cylinder slides in the back portion of the front cylinder, and where the inner cylinder has a radially outwardly projecting flange. The back cylinder is received around the inner cylinder and has a forward end and a rear end. The forward end of the back cylinder is fixed to the front cylinder, and the rear end of the back cylinder has a radially inwardly projecting flange that abuts the radially outwardly projecting flange on the inner cylinder for limiting the axial movement of the inner cylinder. An annular space is defined between the inner cylinder and the back cylinder; and spring element is received in the annular space. An open longitudinal bore is defined from the back end of and through the inner cylinder to the front portion of and through the front cylinder. The inner cylinder can preferably slide completely out of the front cylinder, and the front end of the inner cylinder is preferably beveled so that the inner cylinder can slide easily into the bore through the front cylinder. The inner cylinder preferably has wire-holding means for holding a wire in a fixed position in the bore. The wire-holding means preferably includes a projection that extends into the bore for engaging insulation on the wire and/or a wire stop for providing a surface that the insulation abuts. A cap or plug is preferably included that removeably engages with the front portion of the front cylinder for covering the bore.

The present invention provides in another embodiment a device consisting of first, second and third members and a spring element, where each of the first, second and third members has a length and an axial bore throughout its length. The first member slides within the axial bore of the second and third members. The third member is fastened to the second member and limits the movement of the first member, and the spring element is engaged with the first and second members for moving the second member with respect to the first member.

Having described the invention above, various modifications of the techniques, procedures, materials, and equipment will be apparent to those skilled in the art. It is intended that all such variations within the scope and spirit of the invention be included within the scope of the appended claims.

What is claimed is:

1. A safety device for covering a bare end of an otherwise insulated electrical power wire, comprising:

an inner member having a generally cylindrical tubular shape and an open bore through the inner member for receiving the wire in the bore, wherein the inner member has means for holding the wire in a fixed position with respect to the inner member such that an insulated portion of the wire is within the bore while the bare end of the wire protrudes from the inner member;

an outer member for covering the bare end of the wire and thereby reducing the risk of electrical shock, wherein the outer member has an opening through the outer member, wherein the inner member is moveably received in the opening in the outer member; wherein an annular space is defined between an outer surface of the inner member and an inner surface of the outer member, and a spring element received in the annular space and engaged with the inner and outer members for moving the outer member with respect to the inner member between an uncovered position and a covered position, wherein the outer member surrounds the bare end of the wire in the covered position, and wherein the bare end of the wire is not completely surrounded while the outer member is in the uncovered position, wherein the inner member has a radially-outwardly-projecting flange, wherein the outer member has a radially-inwardly-projecting flange, wherein the movement of the outer member with respect to the inner member is limited by abutment of the flange on the outer member with the flange on the inner member.

2. The safety device of claim 1, wherein the outer member comprises a first member and a second member attached to the first member for assembly of the safety device, wherein each of the first and second members has a generally cylindrical tubular shape, wherein the first member is positioned to cover the bare end of the wire while the outer member is in the covered position, wherein the second member is positioned to enclose the spring element, wherein the first member can be moved to surround the inner member for positioning the outer member into the uncovered position until stopped by spring force or by the flange on the inner member abutting an end of the first member.

3. The safety device of claim 2, wherein the spring element is a coiled spring.

4. The safety device of claim 3, wherein the inner member has a front portion and an opposing back portion, wherein the flange on the inner member is located between the front portion and the back portion of the inner member, wherein the second member of the outer member has a front end and a rear end, wherein the front end of the second member is attached to the first member, and wherein the radially-inwardly-projecting flange on the outer member is located on the rear end of the second member of the outer member.

5. The safety device of claim 4, further comprising a cap or plug tethered to the inner or outer member, wherein the cap or plug can be removeably engaged with the first member of the outer member for covering the opening in the outer member and completely enclosing the bare end of the wire while the outer member is in the covered position.

6. A device for covering a bare end of an otherwise insulated electrical power wire, comprising:

a front cylinder for covering the bare end of the wire and thereby reducing the risk of electrical shock, the front cylinder having a tubular shape, opposing ends, a front portion and a back portion;

an inner cylinder for receiving and engaging an insulated portion of the wire, the inner cylinder having a tubular shape, a front end and a back end, wherein the bare end of the wire protrudes from the front end of the inner cylinder while in use, wherein the front end of the inner cylinder slides in the back portion of the front cylinder, and wherein the inner cylinder has a radially outwardly projecting flange;
a back cylinder received around the inner cylinder, the back cylinder having a forward end and a rear end, wherein the forward end of the back cylinder is fixed to the front cylinder, wherein the rear end of the back cylinder has a radially inwardly projecting flange, and wherein an annular space is defined between the inner cylinder and the back cylinder; and
spring means received in the annular space,
wherein an open longitudinal bore is defined from the back end of and through the inner cylinder to the front portion of and through the front cylinder, and
wherein the radially outwardly projecting flange of the inner cylinder is trapped between one end of the front cylinder and the radially inwardly projecting flange of the back cylinder for limiting the axial movement of the inner cylinder with respect to the front and back cylinders.

7. The device of claim 6, wherein the front portion of the front cylinder has a greater outside diameter than the back portion, wherein a shoulder is defined between the front portion and the back portion, and wherein the forward end of the back cylinder is fixed to the front cylinder at the shoulder.

8. The device of claim 7, wherein the spring means has a front end received between the back portion of the front cylinder and the forward end of the back cylinder, and wherein the front end of the spring means is proximate to the shoulder on the front cylinder.

9. The device of claim 8, wherein the spring means is a coiled spring, and wherein the coiled spring tends to move the back cylinder into a position in which the radially inwardly projecting flange on the back cylinder abuts the radially outwardly projecting flange on the inner cylinder, and wherein the radially inwardly projecting flange on the back cylinder is spaced apart from the radially outwardly projecting flange on the inner cylinder while the coiled spring is compressed.

10. The device of claim 6, wherein the inner cylinder is or is nearly completely out of the front cylinder while the front cylinder is in position to cover the bare end of the wire.

11. The device of claim 10, wherein the front end of the inner cylinder is beveled so that the inner cylinder can slide easily into the bore through the front cylinder.

12. The device of claim 6, wherein the inner cylinder has wire-holding means for holding a wire in a fixed position in the bore.

13. The device of claim 12, wherein the wire-holding means includes a projection that extends into the bore for engaging insulation on the wire and/or a wire stop for providing a surface that the insulation abuts.

14. The device of claim 6, wherein the annular space defined between the inner cylinder and the back cylinder extends into an annular volume defined between the back portion of the front cylinder and the forward end of the back cylinder, wherein the spring means is a coiled spring having opposing ends, wherein one end of the coiled spring is in the annular volume and butts against a portion of the front cylinder, and wherein the other end of the coiled spring butts against the radially outwardly projecting flange on the inner cylinder while the coiled spring is compressed.

15. The device of claim 6, further comprising a cap or plug tethered to the front cylinder or to the back cylinder for engagement with the front cylinder to fully enclose the bare end of the wire.

16. A device consisting of first, second and third members and a spring element,
wherein each of the first, second and third members has a length and an axial bore throughout its length,
wherein the first member slides within the axial bore of the second and third members,
wherein the third member is fastened to the second member and limits the movement of the first member,
wherein the spring element is engaged with the first and second members for moving the second member with respect to the first member,
wherein the first member has an outwardly-projecting flange, wherein the third member has an inwardly-projecting flange that abuts the outwardly-projecting flange for keeping the first member within the axial bore of the second and third members, wherein an annular space is defined between the first member and the second and third members, and wherein the spring element is in the annular space.

17. The device of claim 16, wherein the device is designed and sized to attach to an insulated electrical power wire and surround a bare end of the wire for reducing the risk of electrical shock, wherein the first member has wire-holding means for fastening an insulated portion of the wire within the bore through the first member, and wherein the second and/or third member is moveable with respect to the first member for covering and uncovering the bare end of the wire.

18. The device of claim 16, wherein the device is designed and sized to attach to an insulated electrical power wire and surround a bare and uninsulated end of the wire for reducing the risk of electrical shock, wherein the first member is designed and sized to receive and engage an insulated portion of the end of the wire and allow the bare and uninsulated end of the wire to protrude from the first member, wherein the second and/or third members are moveable into and out of a position for surrounding an end portion of the bare and uninsulated end of the wire.

19. The device of claim 18, wherein the spring element is a coiled spring, wherein the coiled spring has a relaxed state and an energy-storing state, wherein the second and/or third members are in the position for surrounding the end portion of the bare and uninsulated end of the wire while the coiled spring is in its relaxed state, and wherein the second and/or third members are out of the position for surrounding the end portion of the bare and uninsulated end of the wire while the coiled spring is in its energy-storing state.

20. The device of claim 16, wherein the device is designed and sized to cover the bare end of an otherwise insulated electrical power wire for reducing the risk of an electrical shock, wherein at least the second member is made of an electrically-insulating and/or an electrically-nonconductive material, wherein the spring element has a relaxed state and an energy-storing state, wherein the first member is sized to receive and hold an insulated portion of the wire, wherein the second member is sized to surround the bare end of the wire, wherein the second element surrounds the bare end of the wire while the spring element is in its relaxed state, wherein the second and third members can be moved over the first member for exposing the bare end of the wire, which puts the spring element into its energy-storing state, and wherein the outwardly-projecting flange on the first member is trapped between an end of the second member and the inwardly-projecting flange of the third member for limiting the axial movement of the first member with respect to the second and third members.

* * * * *